United States Patent
Yamamoto

[11] 3,938,058
[45] Feb. 10, 1976

[54] TUNABLE LASER
[75] Inventor: Manabu Yamamoto, Odawara, Japan
[73] Assignee: Hitachi, Ltd., Japan
[22] Filed: Mar. 25, 1974
[21] Appl. No.: 454,710

[30] Foreign Application Priority Data
Mar. 26, 1973 Japan.................. 48-34270

[52] U.S. Cl.............. 331/94.5 C; 350/147; 350/150
[51] Int. Cl.²......................................... H01S 3/082
[58] Field of Search.................... 331/94.5; 330/4.3; 350/147, 150

[56] References Cited
UNITED STATES PATENTS
3,436,678   4/1969   Sharp et al.................. 331/94.5
3,466,565   9/1969   Rigrod........................ 331/94.5

OTHER PUBLICATIONS
Hansch, Applied Optics, Vol. 11, No. 4, Apr., 1972, pp. 895–898.

*Primary Examiner*—Robert J. Webster
*Attorney, Agent, or Firm*—Craig & Antonelli

[57] ABSTRACT

A tunable laser is disclosed in which a plurality of laser beams different from one another in wavelength and polarization can be simultaneously oscillated. The tunable laser is advantageous among others in that an atomic absorption spectroscopic analysis can be carried out with very high sensitivity when it is used as, for example, a light source for two-wavelength measurement in the atomic absorption spectroscopic analysis.

7 Claims, 6 Drawing Figures

LASER BEAM

LASER BEAM

TUNABLE LASER

BACKGROUND OF THE INVENTION

1. Field of the Invention

This invention relates to a tunable laser in which a plurality of spectral lines different from one another not only in wavelength but also in polarization can be simultaneously oscillated.

2. Description of the Prior Art

Since the advent of the laser, various proposals have been made in regard to applications of the laser. The laser is especially advantageous over light sources of other kinds in that it provides a spectroscopic light source emitting a light beam of satisfactory directivity and the light beam emitted therefrom is excellent in monochromaticity.

However, the laser has a disadvantage that individual sources of laser beams must be prepared for a plurality of desired wavelengths due to the fact that the oscillation wavelength of the laser beam cannot be freely controlled. Such a disadvantage is obviated by wavelength conversion techniques including dye laser and parametric oscillator.

An atomic absorption spectroscopic analysis for the quantitative analysis of an element contained in a sample comprises causing a spectral line having the same wavelength as that of the specific element to pass through an atomic vapor layer of the element and measuring the quantity of light absorption occurring when the atoms in the ground state in the atomic vapor of the element are excited to shift to an upper state. The detection sensitivity of the atomic absorption spectroscopic analysis can be improved when the emission spectral line width of the light source used in the analysis is selected to be at least equal to the absorption spectral line width of the element which is quantitatively analysed. In a prior art technique of atomic absorption spectroscopic analysis, emission from a hollow cathode discharge tube or high frequency discharge tube containing the same element as that quantitatively analysed has been utilized for such a purpose. However, the prior art analysis technique has been inconvenient in that separate light sources must be prepared when it is desired to quantitatively analyze a plurality of elements.

Further, two-wavelength measurement is frequently employed in the technique of atomic absorption spectroscopic analysis. This two-wavelength measurement is employed as a compensating means which eliminates such a disadvantage that the precision of measurement in the prior art atomic absorption spectroscopic analysis technique tends to be adversely affected by variations or instability of the emission intensity of the light source and the concentration of the sample relative to time. A method disclosed in an article of T. Hadeishi reported in "Applied Physics Letters", Vol. 21, pp. 438–440 (1972) is a typical example of the two-wavelength measurement and employs a Zeeman-effect tunable light source. According to the method disclosed in this article, a light source (commonly containing an isotope of a sample element subjected to quantitative analysis) is used so as to emit a suitable spectral line which is very close to the absorption spectral line of the element to be quantitatively analysed, and a magnetic field is applied to the light source for the purpose of Zeeman splitting of the emitted spectral line. One of the components obtained by the Zeeman splitting is subjected to the Zeeman shift so that it has the same wavelength as that of the absorption spectral line of the sample element, while the other component is utilized as reference light which is not absorbed by the sample element. These two components can be easily separated from each other by an analyser due to the fact that they are polarized in different degrees by the Zeeman effect. Thus, this method is advantageous in that, when the light emitted from the light source is passed through the sample and the intensities of the two polarization components contained in the light transmitted through the sample are compared with each other, the ratio therebetween indicates solely the quantity of light absorbed by the sample and the result of analysis is not adversely affected by variations or instability of the emission intensity of the light source and the concentration of the sample. However, the Zeeman-effect tunable light source is defective in that the tunable range of the wavelength is quite narrow. Because of this defect, it is also inevitable to prepare separate light sources for the analysis of a plurality of elements.

SUMMARY OF THE INVENTION

With a view to obviate the defect pointed out above, it is a primary object of the present invention to provide a novel and improved tunable laser in which a plurality of laser beams different from one another in wavelength and polarization can be simultaneously oscillated, the wavelength of these laser beams being capable of being varied over a wide range.

The present invention is featured by the provision of a tunable laser comprising a pair of reflectors, a laser active material interposed between these reflectors, and means for exciting this laser active material, wherein an interference plate having an optically anisotropic property is additionally disposed between these reflectors.

The term "optical anisotropy" is used in this specification to denote such a property that the refractive index of a material or the reflection coefficient of the surface of a body varies depending on the polarization of incident light.

The tunable laser according to the present invention is featured by the fact that each of the laser beams consists of a plurality of spectral lines which are close to one another in wavelength and which are different from one another in polarization, and yet, the wavelengths of these spectral lines can be varied over a wide range.

Such a tunable laser is used as a light source in the present invention. Various tunable lasers are described in a Japanese magazine entitled "Bunko Kenkyu (Researches on Spectroscopy)", Vol. 21, No. 2. Among these tunable lasers, the dye laser and parametric wavelength conversion laser are especially advantageous in that they have a wide tunable range in wavelength. It is also known that the tunable range can be further widened by the combination of these two lasers, that is, by applying the parametric wavelength conversion technique to the light emitted from the dye laser. Another important feature of the present invention which is improved over the tunable lasers known in the art resides in the fact that a special means for selecting the oscillation wavelength is provided so that a plurality of spectral lines including different polarization components can be simultaneously oscillated.

DESCRIPTION OF THE PREFERRED EMBODIMENTS

Figure 1:
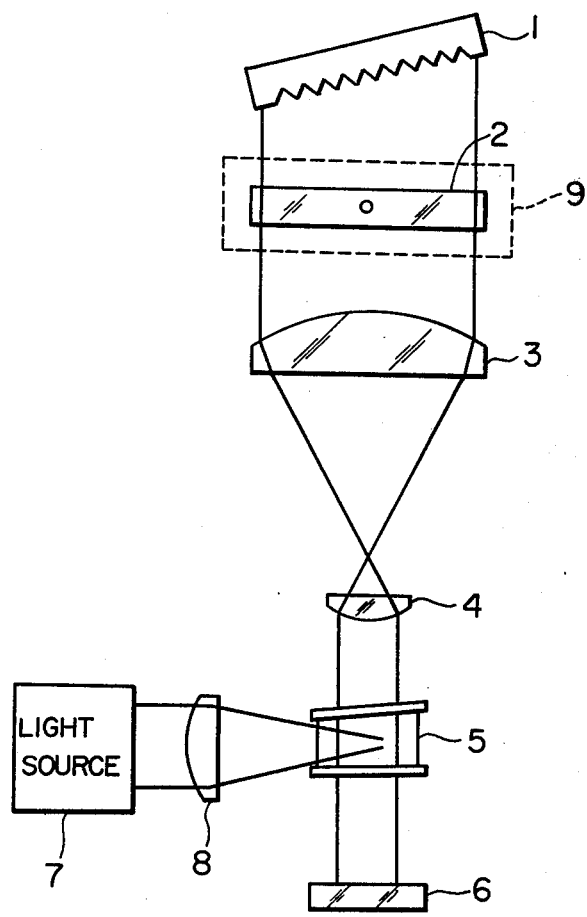
FIG. 1 is a schematic cross-sectional view showing the arrangement of component elements in a tunable laser according to the present invention.

FIG. 1 is a schematic cross-sectional view showing the arrangement of component parts of a tunable laser based on the principle of the present invention.

Referring to FIG. 1, an optical interference plate 2 which includes a transparent plate of optically anisotropic material is disposed opposite to a reflector which may be a reflecting type diffraction grating 1. This interference plate 2 has such a structure that a metal on dielectric material is evaporated on the opposite principal surfaces of a transparent plate of optically anisotropic material to constitute a reflector or a transparent plate of optically anisotropic material is interposed between a pair of reflectors disposed opposite to each other.

Means are provided for causing rotation of the reflecting type diffraction grating 1 and optical interference plate 2 around respective axes which are normal to the plane of the sheet on which the drawing is depicted. A lens system 3 and a beam magnifying system 4 are provided for improving the resolution of the diffraction grating 1 which selects the wavelength. However, these systems 3 and 4 may be eliminated depending on applications as they do not contribute essentially to the operation of the tunable laser. A dye cell 5 contains therein a solution of a dye which acts as a laser active material. Although the oscillation wavelength range differs depending on the dye, a material such as an organic scintillator or a coumarine dye which can oscillate in the ultraviolet or in the visible range of relatively short wavelengths is preferably used as a light source for atomic absorption spectroscopic analysis. Another reflector 6 cooperates with the reflector 1 to constitute a laser cavity. A pumping light source 7 directs light to the dye cell 5 through a condenser lens system 8. A reflector may be used in lieu of the condenser lens system 8, and this condenser lens system 8 may be eliminated when the light source 7 can emit light with good directivity. In order to prevent variations of the oscillation wavelength depending on the temperature, it is desirable that the entire laser cavity or the interference plate 2 is housed within a temperature controller 9 as shown in FIG. 1.

In operation, the light emitted from the pumping light source 7 excites the dye in the dye cell 5 and laser oscillation occurs in the laser cavity constituted by the reflector 1 and reflector 6. The laser beam thus obtained is derived outside from the laser cavity through the reflector 6.

Figure 2:
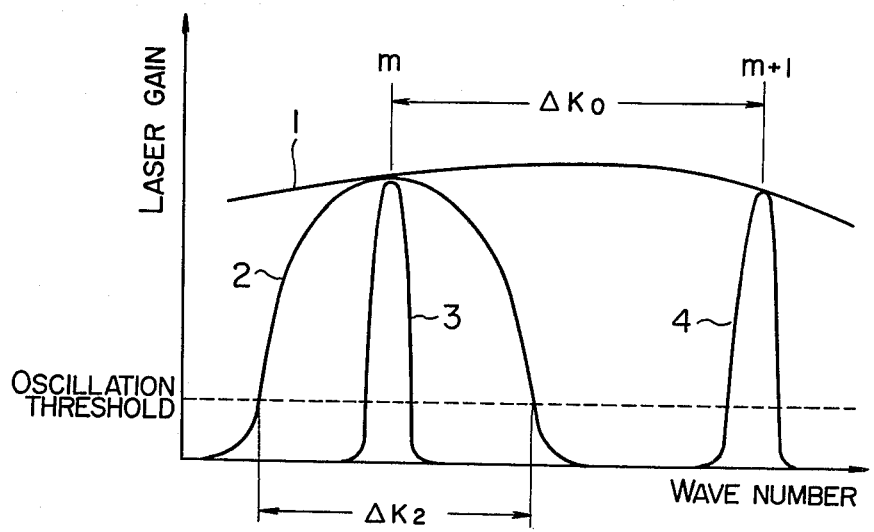
FIG. 2 is a graph showing the relation between the wave number and the laser gain for illustrating the wavelength selecting characteristic of a reflector in the tunable laser shown in FIG. 1.

FIG. 2 shows the characteristic of the reflector 1 which selects the oscillation wavelength. In FIG. 2, the horizontal axis represents the wave number which is the reciprocal of the wavelength, and the vertical axis represents the gain of the laser. The dye laser can oscillate within a wide wave number range with the laser gain as shown by the curve ① in FIG. 2, but the actual wave number range is limited to a range as shown by the curve ② due to the wave number selecting function of the diffraction grating or reflector 1. In the present embodiment, the reflecting type diffraction grating 1 is used as a wave number selecting means, but this wave number selecting means may be a reflector using a multilayer, prism or the like. However, due to the fact that the wave number width $\Delta K_2$ in the oscillation region selected by the reflector 1 having such a wave number selecting function is still far large compared with the absorption spectral line width of the atoms of a sample element, high detection sensitivity cannot be obtained when the device is used as a light source for atomic absorption spectroscopic analysis in the state in which the wave number width is quite large as shown. It is therefore required to make the laser oscillation wavelength range (i.e. the laser oscillation wave number region) narrower, this purpose is attained by the interference plate 2. This interference plate 2 is an important part of the tunable laser of the present invention which contributes to the limitation of the oscillation wave number, and at the same time, to the determination of polarization of the oscillation beam. The function of the interference plate 2 will now be described in detail.

The interference plate 2 is made of an optically anisotropic material as described previously so as to attain a simultaneous oscillation of lights of different polarization and different wavelength which is the important feature of the tunable laser according to the present invention. At first, suppose that the interference plate is made of an optically isotropic material having a refractive index $n$. Suppose further that the thickness of the interference plate, that is, the distance between the opposite reflecting surfaces thereof is $d$ and the angle of incidence of the laser beam on the reflecting surface of the interference plate is A. According to the theory of interference, the transmission of the interference plate is maximum at a wave number $K$ at which the interference order $m$ defined by the following equation will be an integer.

$$m = 2Knd \cdot \cos A \tag{1}$$

Here, the transmission is minimum when the interference order $m$ is integer/2. The laser oscillation occurs only at a point at which the transmission of the interference place is maximum, that is, at a point in the vicinity of the wave number at which the interference order $m$ is an integer. Thus, the wavelength selection property, that is, the tuning curve ③ of the interference plate has a width narrower than that of the tuning curve ② of the diffraction grating, and a sharp peak appears only in the vicinity of the point at which the interference order $m$ is an integer. There exists another wave number value which satisfies periodically the condition for the maximum transmission for another integer value of the interference order. The wave number interval therebetween is given by $$\Delta K_o = (2nd \cdot \cos A)^{-1} \qquad (2)$$

The curves ③ and ④ in FIG. 2 represent the tuning property of the interference plate above described. The curve ③ is included within the region of the curve ② and the laser oscillation occurs only in the region in which the curves ② and ③ exist simultaneously, that is, in the narrow region ② which is determined by the tuning property of the interference plate. High detection sensitivity can be expected due to the fact that the wave number width of the region ② can be selected to be equal to or less than the absorption spectral line width of the atoms of the sample element.

It is shown in FIG. 2 that the tuning curve ③ corresponds to the interference order $m$ and the tuning curve ④ corresponds to the interference order $(m+1)$. The relation between the wave number width $\Delta K_2$ selected by the reflector and the interference interval $\Delta K_o$ may be suitably selected so that the tuning curve corresponding to the interference order $(m+1)$ or $(m-1)$ may not exist within the region of the tuning curve ②. In such a case, only one spectral line appears within the region of the tuning curve ②. It may be approximately defined that a single spectral line appears within the region of the tuning curve ② when $\Delta K_o > \Delta K_2$, and the oscillation occurs at a plurality of wave number values when $\Delta K_o < \Delta K_2$.

In the later description, the case in which the condition for producing a single spectral line within the above region is satisfied, will be solely considered from the standpoint of simplicity of description and in view of the practical value. However, this is not in any way an essential condition which will limit the basic principle of the present invention.

A method of obtaining a single tuning curve having a sharp peak by use of an interference plate of optically isotropic material has been described in the above. The fact that the wave number of emission can be varied by adjusting the angle of incidence of light on the interference plate and the reflector in the form of a prism or diffraction grating, is also apparent when the properties of these wavelength selecting elements are considered.

In the next place, consider the case in which the interference plate is composed of a material which is optically anisotropic. For convenience of description, it is supposed that the two axes, for example, the X-axis and Y-axis among the major axes of a refractive index ellipsoid of optically anisotropic material are parallel with the mirror surface of the interference plate and that $n^{(1)}$ and $n^{(2)}$ are the refractive indices for the light polarized in the two directions respectively. Then, the tuning property of the interference plate for the light polarized in the direction of the X-axis can be discussed independently of that for the light polarized in the direction of the Y-axis. The interference orders $m^{(1)}$ and $m^{(2)}$ for the respective polarized light beams are given by $$m^{(1)} = 2K^{(1)}n^{(1)}d \cdot \cos A \qquad (3)$$

$$m^{(2)} = 2K^{(2)}n^{(2)}d \cdot \cos A \qquad (4)$$

Figure 3:
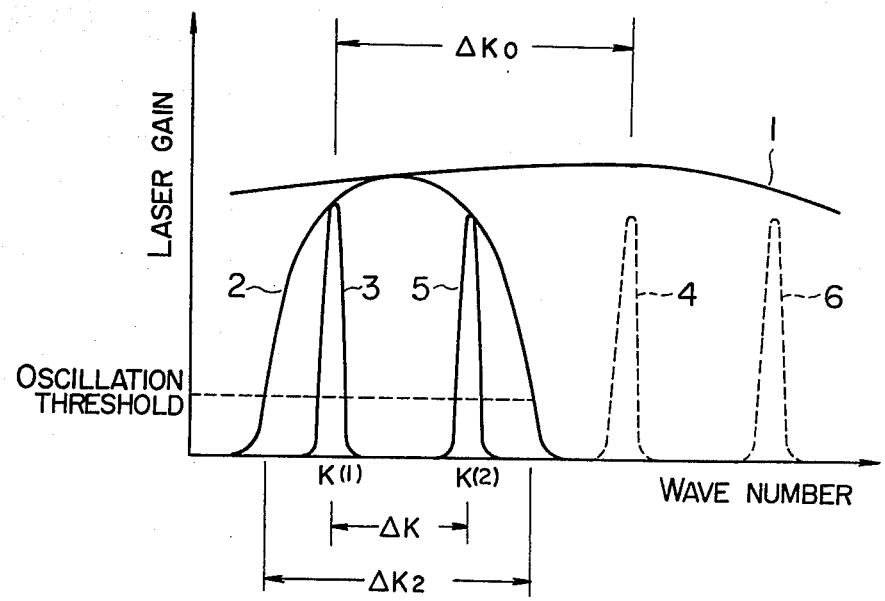
FIG. 3 is a graph showing the relation between the wave number and the laser gain for illustrating the characteristic of an interference plate having an optically anisotropic property employed in the tunable laser of the present invention.

Therefore, the laser can emit simultaneously two spectral lines which are different from each other in wave number and polarization when both the wave numbers $K^{(1)}$ and $K^{(2)}$ give integral values of the interference orders $m^{(1)}$ and $m^{(2)}$ and exist within the region of the tuning curve of the wavelength selecting reflector in the form of the prism or diffraction grating. The tuning curves ③ and ⑤ in FIG. 3 represent such a case. The spectral line having the wave number $K^{(1)}$ is polarized in the direction of the X-axis, while the spectral line having the wave number $K^{(2)}$ is polarized in the direction of the Y-axis. The tuning curves ④ and ⑥ corresponding to the respective interference orders $[m^{(1)}+1]$ and $[m^{(2)}+1]$ exist outside of the region of the tuning curve ② as apparent from the condition described previously.

The following condition must hold at least in order that both the two spectral lines which are different from each other in wave number and polarization must exist within the region of the same tuning curve ②. More precisely, the following relation must hold:

$$|\Delta K| < \Delta K_2 \qquad (5)$$

where $\Delta K = K^{(1)} - K^{(2)}$.

The following equation is generally obtained by differentiating the equation (1):

$$\frac{\Delta K}{K} + \frac{\Delta n}{n} = \frac{\Delta m}{m} \qquad (6)$$

where $K^{(1)} \approx K^{(2)} = K$, $n^{(1)} \approx n^{(2)} = n$, $m^{(1)} \approx m^{(2)} = m$, $\Delta n = n^{(1)} - n^{(2)}$, and $\Delta m = m^{(1)} - m^{(2)}$. It is therefore necessary to select suitable values of $\Delta n$ and $\Delta m$ so that $\Delta K$ can satisfy the equation (6). Especially, when $\Delta m = 0$, that is, when the two spectral lines have the same interference order, the equation (6) is expressed as $$\frac{\Delta K}{K} = - \frac{\Delta n}{n} \qquad (7)$$

In this case, the difference $\Delta n$ between the refractive indices of the material composing the interference plate must correspond to the predetermined difference $\Delta K$ between the wave numbers. The tunable width of the tunable laser including the prism or diffraction grating is determined from the limit of the resolution of the prism or diffraction grating, and numerically, it is of the order of $|\Delta K_2/K| \approx 10^{-4}$. Therefore, the required difference $\Delta n$ between the refractive indices of the material composing the interference plate is also very slight. When $\Delta m \neq 0$, $\Delta m$ and $\Delta n$ should be selected so as to satisfy the relation $$\frac{\Delta K}{K} = \frac{\Delta m}{m} - \frac{\Delta n}{n} \qquad (8)$$

and especially when $|\Delta K/K| << |\Delta m/m|$, the following relation must hold:

$$\frac{\Delta m}{m} \cong \frac{\Delta n}{n} \qquad (9)$$

A material showing an electro-optic effect may be conveniently used to form the interference plate in order that the difference $\Delta n$ between the refractive indices has the required value. More precisely, it is convenient to use materials showing the Pockels effect and Kerr effect because optical anisotropy is produced in the materials in response to the application of an electric field and the magnitude of the optical anisotropy $\Delta n$ can be set at any desired value by suitably adjusting the strength of the electric field.

Figure 4:
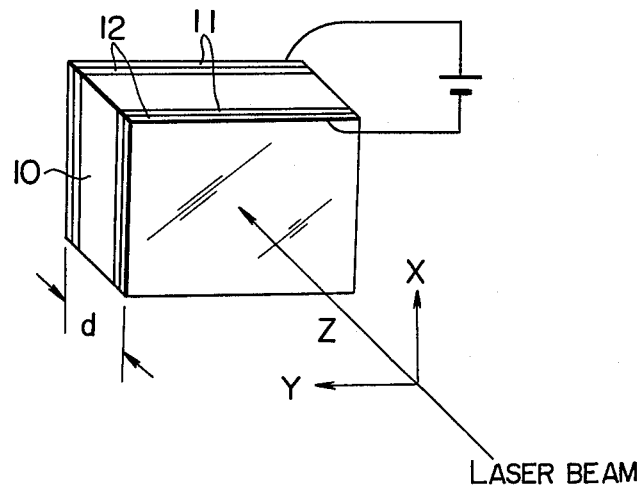
FIG. 4 is a schematic perspective view showing the structure of one form of the optically anisotropic interference plate employed in the tunable laser of the present invention.

One form of the optically anisotropic interference plate utilizing the Pockels effect is shown in FIG. 4. Referring to FIG. 4, a flat plate 10 of potassium dihydrogen phosphate (hereinafter referred to as KDP) is disposed in such a manner that the Z-axis thereof registers with the optical axis of the laser cavity. A dielectric multilayer 11 is evaporated on each of the opposite principal surfaces of the flat plate 10 of KDP, and a transparent electrically conducting layer 12 is evaporated on each dielectric multilayer 11. These layers 11 and 12 constitute a so-called multilayer reflector. The reflective index of this multilayer reflector is desirably as high as possible, but it is required to permit transmission of light to some extent.

When a voltage V is applied across the electrically conducting layers 12, optical anisotropy is produced in the flat plate 10 of KDP by the electrooptic effect with respect to the two directions perpendicular to each other in the plane perpendicular to the Z-axis, (hereinafter refered to Z-axis, (hereinafter refered to Z-plate). These two directions are the direction of the X-axis and the direction of the Y-axis in FIG. 4. As a result, the refractive index for light polarized in the direction of the X-axis differs from that for light polarized in the direction of the Y-axis. The difference $\Delta n$ between these refractive indices is proportional to V/d where d is the thickness of the flat plate 10 of KDP. When $d = 1\ m$ and $V = 1.5\ kV$, $\Delta n = 0.55 \times 10^{-4}$ in the case of light having a wavelength of the order of 4000 A. Suppose that the refractive index n of KDP is 1.52, then $|\Delta K| = 0.9\ cm^{-1}$ can be obtained from the equation (7). It will thus be understood that the tunable laser having such an optically anisotropic interference plate in the laser cavity can emit simultaneously two spectral lines which are spaced apart from each other by 0.9 $cm^{-1}$ in wave number and these two spectral lines are polarized in the directions which are perpendicular to each other. It is known from the equation ( 2) that the interference interval $\Delta K_o$ in this interference plate is $\Delta K_o = 3.3\ cm^{-1}$.

In the above description, the opposite surfaces of the flat plate constituting the core of the interference plate are shaped in the form of mirror surfaces. However, such an optically anisotropic interference plate may be constituted by disposing a flat plate of optically anisotropic material in the space defined between confronting mirror surfaces of a pair of reflectors (i.e. so-called etalon), disposed opposite to each other. Further, fine meshed electrodes or annular electrodes may be used as the means for applying the voltage in lieu of the electrically conducting layers. Furthermore, the electric field may be applied in a direction perpendicular to the direction of the laser beam by suitably selecting the direction of the crystal axes. These are commonly widely known in the technical field of light modulators and the like which utilize the fact that the refractive index of a material can be varied by the electro-optic effect. Further, the methods including the method of constituting the etalon and the method for forming the reflecting layers and electrically conducting layers are also commonly widely known in the art. When the optically anisotropic flat plate disposed in the space defined between the mirror surfaces of the etalon has a thickness smaller than the width of the space and a gap is formed therebetween, this gap may be regarded as a dielectric layer and the theory of a multilayer interference plate described later may be applied. (In this case, the gap acts as an optically isotropic medium and the optical anisotropy is produced by the flat plate.)

Further, in lieu of resorting to the electrooptic effect, optical anisotropy inherent in a certain kind of crystalline material may be utilized. In this case, the magnitude $\Delta n$ of the optical anisotropy cannot be freely controlled due to the fact that $\Delta n$ in a specific material has a specific value. This problem can however be solved in a manner as described below. In the former calculation, the thickness d of the interference plate is not taken into account in deriving the equation (6) from the equation (1). When this thickness d is taken into account, the equation (6) is generally expressed as $$\frac{\Delta K}{K} + \frac{\Delta(nd)}{nd} = \frac{\Delta m}{m} \qquad (10)$$

Suppose that the interference plate is composed of laminated layers of a plurality of materials having refractive indices different from one another, then the following relations hold:

$$(nd)^{(1)} \cong (nd)^{(2)} \equiv (nd) \rightarrow \sum_j (n_j d_j) \qquad (11)$$

$$\Delta(nd) \equiv (nd)^{(1)} - (nd)^{(2)}$$
$$\rightarrow \sum_j (n_j d_j)^{(1)} - \sum_j (n_j d_j)^{(2)}$$
$$= \sum_j [n_j^{(1)} - n_j^{(2)}] d_j = \sum_j \Delta n_j d_j \qquad (12)$$

Figure 5:
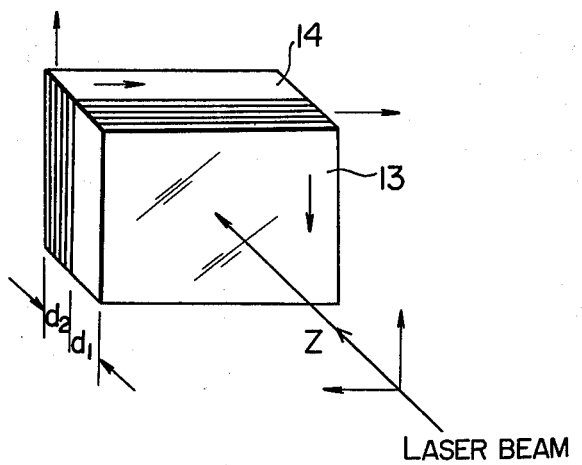
FIG. 5 is a schematic perspective view showing another form of the optically anisotropic interference plate employed in the tunable laser of the present invention.

The theorem given by the equations (1) to (10) applies also to the interference plate of such a structure. In the above relations, $d_j$ designates the thickness of the jth layer, and $n_j^{(1)}$ and $n_j^{(2)}$ designate the respective refractive indices of the jth layer in the directions of two major axes of a refractive index ellipsoid. It is apparent that $$\sum_j \Delta n_j d_j$$

can be set at any desired value by suitably selecting the refractive index and thickness of the individual layers. Consider now a simple example in which the interference plate is composed of a lamination of two layers formed from the same material, two major axes of one of these two layers being heteroctritely arranged to two major axes of the other layer as shown in FIG. 5. In other words, the one layer has the first and second major axes optically similar to the first and second major axes of the other layer, respectively and the first and second axes of the one layer coincide with the second and first axes of the other layer in direction, respectively. Then, the following equation is obtained:

$$\Delta(nd) = \sum_j \Delta n_j d_j = \Delta n_1 d_1 + (-\Delta n_1) d_2$$

$$= \Delta n_1 (d_1 - d_2) \qquad (14)$$

Therefore, $\Delta(nd)$ can be set at any desired value by suitably selecting the thicknesses $d_1$ and $d_2$ of the respective thin plates 13 and 14 even when $\Delta n_1$ is a constant peculiar to the material. However, in order that only one spectral line of the same polarization can exist within the region of the tuning curve ②shown in FIG. 3, the relation $$\Delta K_2 < \Delta K_0 = (2 \sum_j n_j d_j \cdot \cos A)^{-1} \qquad (15)$$

must hold in view of the equation (2) and as apparent from the condition described previously.

When the material is a rock crystal (i.e. transparent quartz), $\Delta n_1 = n_1^{(1)} - n_1^{(2)} = 1 \times 10^{-2}$. Therefore, when $d_1 \approx d_2 = 0.1$ cm and $d_1 - d_2 = 10^{-3}$ cm, $(nd) = 0.31$ and $\Delta(nd) = 10^{-5}$ are obtained from the equations (11) and (13) respectively. Therefore, $|\Delta K/K| = 3.2 \times 10^{-5}$ is obtained from the equation (10) when $\Delta m = 0$. $\Delta K = 1.3$ cm$^{-1}$ when the wavelength is 2500 A ($K = 4 \times 10^4$ cm$^{-1}$).

A reflecting mirror surface may be formed on each of the opposite surfaces of the optically anisotropic flat plate constructed in the manner above described or this flat plate may be disposed between a pair of reflectors forming a so-called etalon so as to constitute an optically anisotropic interference plate.

The above description has referred to the case in which only one spectral line polarized in the direction of the X-axis and only one spectral line polarized in the direction of the Y-axis exist within the region of the tuning curve ②. However, it will be apparent that such lines are selected merely for the sake of convenience as described previously and a plurality of oscillation lines polarized in these directions may exist simultaneously within the above region. In such a case, the equation (14) is not required as a matter of course.

Figure 6:
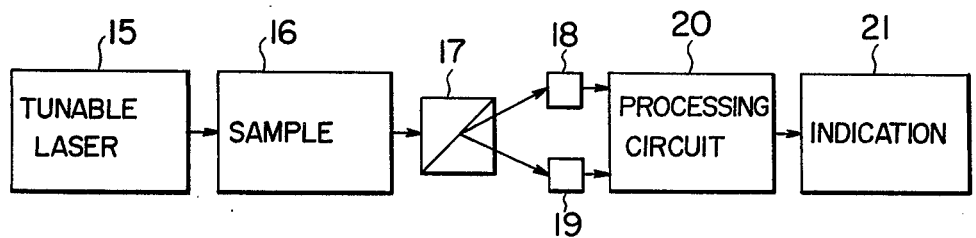
FIG. 6 is a block diagram showing one basic structure of an atomic absorption spectroscopic analysing system in which the tunable laser according to the present invention is used as a light source for spectroscopic analysis.

FIG. 6 is a block diagram of an atomic absorption spectroscopic analysing system employing the tunable laser according to the present invention. The tunable laser designated by the reference numeral 15 emits, for example, two wavelength components which are different from each other in wavelength and polarization. One of the wavelength components is selectively absorbed by the atoms or molecules of a sample by resonance absorption when these two wavelength components are passed through a sample layer 16, and then the two polarization components are separated from each other by an analysing element 17. These separated polarization components are applied to a processing circuit 20 after being subjected to photoelectric conversion by respective photo detectors 18 and 19. In the processing circuit 20, the wavelength component which is not subjected to the resonance absorption is used as a reference signal to seek the ratio between the intensity of this wavelength component and that of the other wavelength component which is subjected to the resonance absorption, and the value thus obtained is applied to an indicator 21 as a signal corresponding to the sample quantity. According to this method, no measurement errors occur due to the fact that the two wavelength components pass along the common optical path in the sample and are equally affected by light intensity fluctuations due to the factors except the resonance absorption, such as scattering and the like caused by the atoms or molecules of coexisting other elements. Therefore, the precision and detection limit of measurement can be improved.

While the present invention has been described with reference to an application to an atomic absorption spectroscopic analysis, the tunable laser according to the present invention can be applied also to an atomic fluorescence analysis. In this case, one of the two laser beams emitted simultaneously from the tunable laser causes emission of resonance fluorescence from the atoms or molecules of a sample, and the intensity of the fluorescence thus produced indicates the quantity of the atoms or molecules of the sample. In this case, this spectral line is also scattered by coexisting atoms, molecules or particles of other elements. The other spectral line does not resonate with the atoms or molecules of the sample and are scattered by these atoms or molecules and by the coexisting atoms, molecules or particles of other elements. The intensity of light thus scattered indicates the background noise. Therefore, the difference between the responses of the sample material against the two spectral lines indicates the existing quantity of the element or material to be detected.

The tunable laser according to the present invention finds wide applications as a light source for use in an atomic absorption spectroscopic analysis, atomic fluorescence analysis and various other spectroscopic analyses.

I claim:

1. A tunable laser comprising:
    an optical resonant cavity capable of supporting a plurality of optical wavelengths within only a selectable prescribed wave number range;
    a laser active medium, disposed within said optical resonant cavity, for producing laser radiation;
    pumping means for exciting said laser active medium, for producing laser radiation at said plurality of optical wavelengths; and
    interference means, disposed within said optical resonant cavity in the path of said laser radiation, for permitting passage therethrough of only a pair of said laser wavelengths, the respective polarizations of which are different, said interference means including a pair of reflectors separated from each other by optically anisotropic material, the refractive index of said anisotropic material and the distance between said reflectors being such that the difference in the wave number between said pair of laser wavelengths is less than said prescribed wave number range.

2. A tunable laser according to claim 1, wherein each of said reflectors is a multi-layer reflector and said anisotropic material is an electro-optic crystal plate on opposite surfaces of which the respective multi-layer reflectors are coated and further including a pair of transparent electrode layers respectively coated on said multi-layer reflectors and a source of voltage connected to said transparent electrode layers.

3. A tunable laser according to claim 2, wherein said anisotropic material comprises a lamination of optically anisotropic material layers having different respective indices of refraction.

4. A tunable laser according to claim 1, wherein said anisotropic material comprises a lamination of optically anisotropic material layers having different respective indices of refraction.

5. A tunable laser according to claim 4, wherein the number of said layers is two, two major axes of one of said layers being heteroctritely arranged to two major axes of the other layer.

6. A tunable laser according to claim 5, wherein said optically anisotropic material layers are made of rock crystal.

7. A tunable laser according to claim 1, wherein said optically anisotropic material is an optically anisotropic crystal.

\* \* \* \* \*